April 30, 1946.  J. E. REILLY  2,399,387

SPEED CONTROL SYSTEM

Filed April 27, 1944

WITNESSES:

INVENTOR
Jack E. Reilly.
BY
James N. Ely
ATTORNEY

Patented Apr. 30, 1946

2,399,387

UNITED STATES PATENT OFFICE 2,399,387

SPEED CONTROL SYSTEM

Jack E. Reilly, Pittsburgh, Pa., assignor to Westinghouse Electric Corporation, East Pittsburgh, Pa., a corporation of Pennsylvania Application April 27, 1944, Serial No. 533,080

4 Claims. (Cl. 219—64)

This invention relates to control systems, and in particular to speed control systems.

An object of this invention is the provision of a quick response, sensitive speed control system.

Another object of this invention is to provide a simplified control system utilizing a rectifier discharge valve having a plurality of control grids therein for controlling the speed of a motor.

A more specific object of this invention is to provide a simplified control system utilizing full wave rectifier discharge valves for controlling the direction and speed of a reversible motor.

Figure 1:
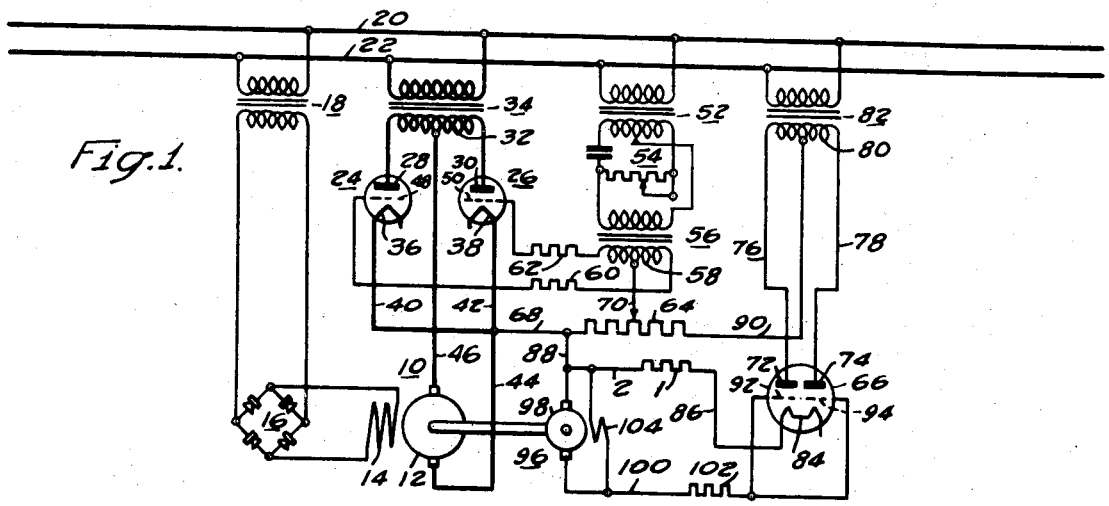
Figure 2:
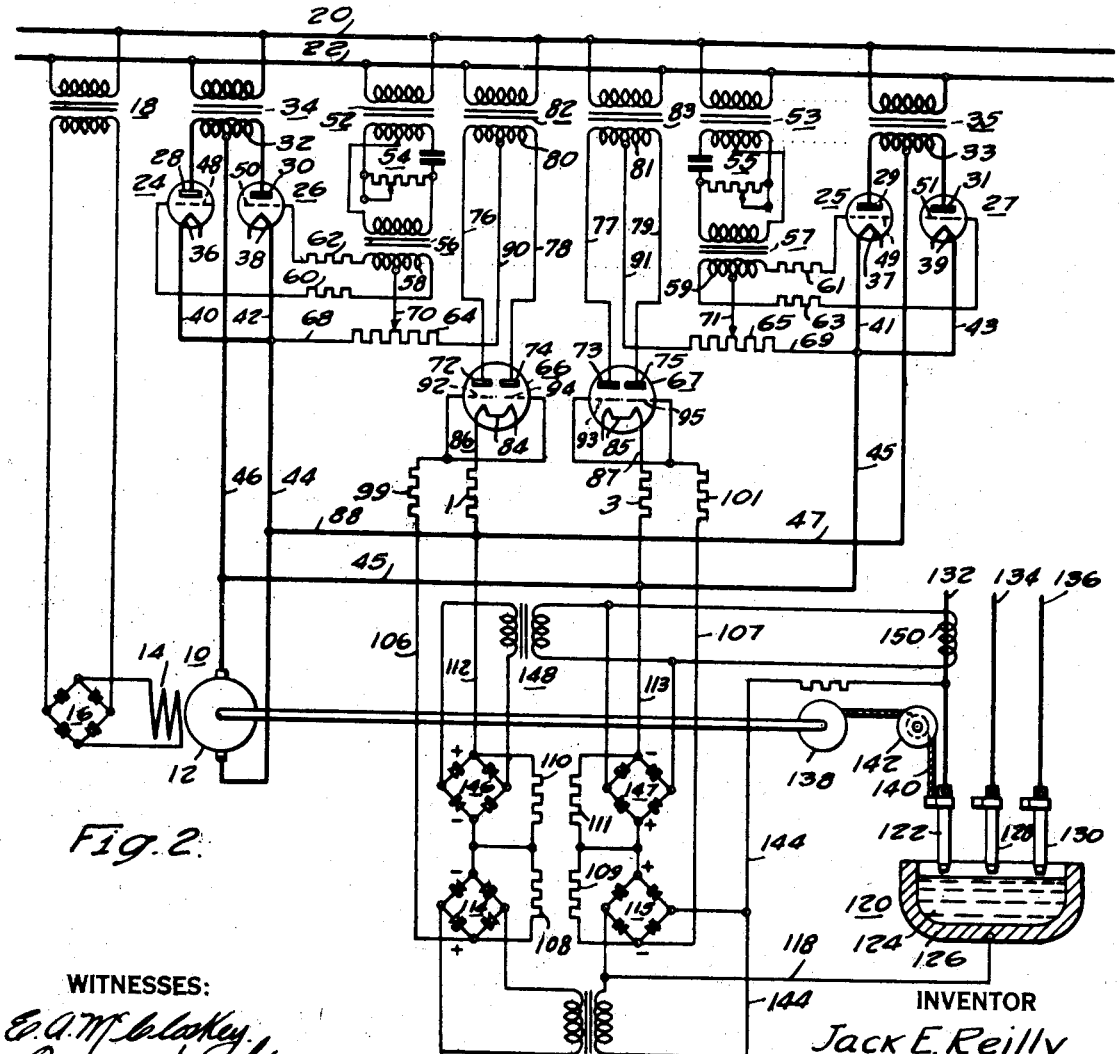

Other objects of this invention will become apparent from the following description when taken in conjunction with the accompanying drawing, in which:

Figure 1 is a diagrammatic view of a speed control system embodying the teachings of this invention, and Fig. 2 is a diagrammatic view of a speed control system embodying the teachings of this invention as applied in controlling the position of an electrode of an arc furnace.

Referring to Fig. 1 of the drawing, this invention is illustrated by reference to a motor 10, the speed of which is to be controlled. The motor 10 comprises the armature windings 12 and the field windings 14 which are connected through a rectifier bridge circuit 16 to the secondary winding of a transformer 18, the primary windings of which are connected across a source of supply of alternating current represented by conductors 20 and 22.

In order to control the speed of the motor 10, suitable discharge devices or electric valves 24 and 26 are connected in the armature winding circuit so as to provide for complete rectification of the alternating current from the source of supply 20 and 22. Thus the anodes 28 and 30 of the discharge devices 24 and 26 respectively, are connected to the terminals of the secondary winding 32 of a transformer 34, the primary winding of which is connected across supply conductors 20 and 22 while the cathodes 36 and 38 are connected by conductors 40 and 42, respectively, to conductor 44 and one side of the armature windings 12, the other side of the armature winding being connected by a conductor 46 to the mid or center tap of the secondary winding 32.

As illustrated, provision is made to control the bias of grids 48 and 50 of discharge devices 24 and 26, respectively, in accordance with variations in the speed of the motor 10. An alternating-current potential is normally supplied to the grids 48 and 50 from the source of supply 20 and 22 through the transformer 52, the phase shifting circuit 54, and the grid transformer 56, the terminals of the secondary winding 58 of which are connected through resistors 60 and 62 to grids 48 and 50, respectively. The discharge devices 24 and 26 are of the well known thyratron type, the conductivity thereof being controlled by the grid-cathode potential which is made up of an alternating-current potential superimposed on a direct-current biasing potential so that the resultant grid-cathode potential becomes more positive than the critical potential of the thyratron to render the device conductive. Thus control of the conductivity of the discharge devices 24 and 26 is obtained by varying the direct-current biasing potential. For this purpose a resistor 64 is disposed to be connected through a full wave rectifier discharge valve 66 to the source of supply 20 and 22, a part of the resistor 64 being connected by conductor 68 to conductors 40 and 42 and the cathodes 36 and 38, respectively, of the discharge devices 24 and 26, and by the adjustable lead 70, to the mid or center tap of the secondary winding 58 of the grid transformer 56.

The full wave rectifier discharge device 66 comprises two anodes 72 and 74 connected by conductors 76 and 78, respectively, to the terminals of the secondary winding 80 of the transformer 82, the primary winding of which is connected across the supply conductors 20 and 22 and a single cathode 84 connected by conductor 86, self biasing resistor 1, conductors 2, 88 and 68 to one end of the resistor 64. The other end of the resistor 64 is connected by conductor 90 to the mid or center tap of the secondary winding 80 of transformer 82. Two grids 92 and 94 are disposed within the rectifier discharge device 66 for controlling the conductivity thereof.

In order to control the bias of the grids 92 and 94 in accordance with the speed of the motor 10, an exciter generator 96 is disposed to be driven by the motor 10. The generator 96 comprises the armature windings 98 connected by conductor 1, through resistor 2 and conductor 86 to the cathode 84 of the rectifier discharge valve 66 and by conductor 100 through resistor 102 to the grids 92 and 94. A shunt field winding 104 is connected across the armature winding 98.

In operation, assuming that the system is energized and that the motor is operating at some predetermined constant speed, the generator 96 functions to control the bias of the grids 92 and 94 of the rectifier discharge device 66 to control the conductivity of the discharge device in a predetermined manner and thereby control the conductivity of the discharge devices 24 and 26.

If the speed of the motor 10 should vary from the predetermined speed as, for example, if the speed should be decreased, the output voltage of the generator 96 is decreased whereby the bias of the grids 92 and 94 of the rectifier discharge device 66 becomes more negative, the grid circuit of such rectifier device extending from the grids 92 and 94 through the resistor 102, conductor 100, armature windings 98, conductors 88 and 2, resistor 1 and conductor 86 to the cathode 84. As the grids 92 and 94 become more negative, the flow of current through the resistor 64 is decreased, the circuit therefor extending from the midtap of the secondary winding 80 of the transformer 82 through conductor 90, resistor 64, and conductors 68, 88 and 2, resistor 1 and conductor 86 to the cathode 84 and anodes 72 and 74 through conductors 76 and 78, respectively, to the terminals of the secondary winding 80.

As the current flowing through the resistor 64 is decreased, the direct-current biasing potential applied to the discharge devices 24 and 26 becomes less negative, the grid control circuits therefor extending from the grids 48 and 50 through resistors 60 and 62, respectively, to the terminals of the secondary winding 58 of transformer 56, the center tap of the secondary winding 58, flexible lead 70, part of the resistor 64, and conductor 68 through conductors 40 and 42 to the cathodes 36 and 38, respectively. As the direct-current biasing potential becomes less negative, the resultant grid-cathode potential of the discharge devices 24 and 26 is so raised that the resultant grid-cathode potential rises above the critical potential of the devices earlier in the half-period, and the discharge devices 24 and 26 become alternately conducting sooner in the half-cycle with the result that the average current conducted becomes greater. Thus, as the biasing potential of discharge devices 24 and 26 becomes less negative, more current flows through the armature windings 12 of the motor 10 through the circuit extending from the center tap of the secondary winding 32 of transformer 34, through conductor 46, the armature windings 12, conductor 44 to and through conductors 40 and 42 to cathodes 36 and 38, respectively, anodes 28 and 30, respectively, to the terminals of the secondary winding 32. This increase in the current flowing through the armature windings 12 increases the speed of the motor 10 to the predetermined required value.

As the speed of the motor approaches the predetermined required value, it is apparent that the biasing potential of the rectifier discharge device 66 is changed in accordance with the output of the generator 96 which is driven by the motor 10. Thus, as the speed of the motor 10 is raised, the output of the generator 96 is also raised so that the biasing potential on the grids 92 and 94 become less negative to permit more current to be conducted by the rectifier discharge device 66 with the result that more current flows through the resistor 64 to render the direct-current biasing potential in the grid-cathode circuit of the discharge devices 24 and 26 more negative with the result that less current is alternately conducted by the devices 24 and 26, thereby controlling the current flow through the armature windings 12 of the motor 10 to prevent an overrun of the predetermined required speed at which it is desired to operate the motor 10. Of course, if for any reason the speed of the motor 10 should increase above the predetermined value, the same operation of the system to decrease the current flow through the armature windings is obtained to effect a decrease in the speed of the motor 10.

Referring to Fig. 2, the system of this invention is illustrated as applied to an arc furnace 120 for controlling the position of the electrode 122 thereof with respect to a metal bath 124 in the receptacle 126. As illustrated, the arc furnace utilizes three electrodes 122, 128, and 130 connected by conductors 132, 134 and 136, respectively, to a source of supply (not shown). Since each electrode 122, 128 and 130 is disposed to be operated in response to predetermined current flow in the electrode and the arc potential thereof, the control system for only the electrode 122 is illustrated, it being understood that similar control systems are to be provided for the other electrodes 128 and 130.

In this embodiment, a major part of the control system comprises the same system and apparatus utilized in the system of Fig. 1, and like numerals are employed for indicating the same parts. Thus in the embodiment of Fig. 2 the motor 10 is utilized for controlling the position of the electrode 122, the electrode 122 being connected to be raised or lowered by operation of the motor 10. For this purpose a winding drum 138 is disposed to be driven by the motor 10, a flexible cable 140 being connected to the electrode 122 and disposed over a pulley 142 to be wound upon the drum 138. Since it is desired that electrode 122 be raised or lowered, as the case may be, the motor 10 comprises a reversible motor in this embodiment.

As illustrated, two sets of discharge devices 24—26 and 25—27 are utilized for controlling the direction and speed of operation of the motor 10. The discharge devices 24, 26, 25 and 27 are provided with anodes 28, 30, 29 and 31, respectively, connected to the terminals of the secondary windings 32 and 33, respectively, of the transformers 34 and 35, respectively, the primary windings of each of which are connected across the supply conductors 20 and 22. Each of the discharge devices 24, 26, 25, and 27 are also provided with cathodes 36, 38, 37 and 39, respectively, the cathodes 36 and 38 being connected through conductors 40 and 42, respectively, to conductor 44, the armature windings 12 of the motor 10, conductor 46, to the center tap of the secondary winding 32 of transformer 34, whereas the cathodes 37 and 39 are connected by conductors 41 and 43, respectively, to conductor 45, conductor 46, the armature windings 12 of motor 10, conductor 44, conductor 88, and conductor 47 to the center tap of the secondary winding 33 of transformer 35. Each of the discharge devices 24, 26, 25 and 27 is provided with a grid, namely, 48, 50, 49 and 51, respectively. An alternating current potential is supplied to the grids 48 and 50 from the supply conductors 20 and 22 through transformer 52 the phase shifting circuit 54, and the grid transformer 56, the terminals of the secondary winding 58 of which are connected through resistors 60 and 62 to grids 48 and 50, respectively. Likewise, an alternating current potential is supplied to the grids 49 and 51 from supply conductors 20 and 22 through transformer 53, the phase shifting circuit 55 and the grid transformer 56, the terminals of the secondary winding 59 of which are connected through resistors 61 and 63 to grids 49 and 51, respectively.

In order to control the grid-cathode potential of the discharge devices 24—26, 25—27, a resistor 64 is disposed in circuit relation with the grids 48 and 50 and a resistor 65 is disposed in circuit relation with the grids 49 and 51, a part of the resistor 64 being connected to the conductors 40 and 42 and the cathodes 36 and 38, respectively, of discharge devices 24 and 26 by the conductor 68, a flexible lead 70 connecting some intermediate point of the resistor 64 to the center tap of the secondary winding 58 of the grid transformer 56. Likewise a part of the resistor 65 is disposed to be connected by conductor 69 to conductors 41 and 43, and cathodes 37 and 39, respectively, of the discharge devices 25 and 27, an intermediate tap of the resistor 65 being connected by a flexible lead 71 to the center tap of the secondary winding 59 of grid transformer 57.

In order to control the direct-current biasing potential for the two sets of discharge devices 24—26 and 25—27, full wave rectifier discharge valves 66 and 67 are disposed to control the current flow through the resistors 64 and 65, respectively. The rectifier discharge devices 66 and 67 are provided with anodes 72—74 and 73—75, respectively, connected to the terminals of the secondary windings 80 and 81, respectively, of transformers 82 and 83, respectively, the primary windings of which are connected across the supply conductors 20 and 22.

The rectifier discharge device 66 is also provided with a cathode 84 connected by conductor 86, self-biasing resistor 1, conductors 88, 44 and 68 to one end of the resistor 64, the other end of the resistor 64 being connected by the conductor 90 to the center tap of the secondary winding 80 of transformer 82. In a similar manner, the rectifier discharge device 67 is also provided with a cathode 85 connected by conductor 87, self-biasing resistor 3, conductors 45 and 69 to one end of the resistor 65, the other end of the resistor 65 being connected by conductor 91 to the center tap of the secondary winding 81 of the transformer 83. Likewise, each of the rectifier devices 66 and 67 is provided with two grids for controlling the conductivity thereof, the rectifier device 66 having grids 92 and 94 and the rectifier device 67 being provided with grids 93 and 95.

The grid biasing potential of the rectifier devices 66 and 67 is controlled in response to the current flow through the electrode 122 and the arc potential thereof. Thus the grid-biasing circuit of the rectifying discharge device 66 extends from the grids 92 and 94 through the grid resistor 99, conductor 106, resistor 108, resistor 110, conductor 112, self-biasing resistor 1, and conductor 86 to the cathode 84. The resistors 108 and 110 are control resistors and are disposed to have a direct-current voltage thereacross proportional to the arc potential and the flow of current through the electrode 122, respectively. In order to impress the direct-current voltage proportional to the arc potential across resistor 108, the resistor 108 is connected across a rectifying bridge 114 which is connected through the transformer 116, the terminals of the primary winding of which are connected by conductor 118 to the receptacles 126 and by conductor 144 to conductor 132. The control resistor 110 is connected across a rectifying bridge circuit 146 which is connected across a transformer 148, the primary windings of which are connected to the current transformer 150 on the supply conductor 132. The transformers 116 and 148 are preferably of a one to one ratio and are employed primarily to prevent sneak circuits or effects on the grids of the rectifier discharge devices 66 and 67.

It is to be noted that the rectifying bridges 146 and 114 are connected in opposition so that the direct-current voltages across resistors 108 and 110 are of opposite polarity, so that for any variation in the flow of current through the electrode and in the arc potential, the differential of the direct-current voltages across resistors 108 and 110 controls the direct-current biasing potential on the grids 92 and 94 of the rectifying discharge device 66.

The grids 93 and 95 of the rectifying device 67 are likewise connected through the grid resistor 101, conductor 107, control resistor 109, control resistor 111, conductor 113, a self-biasing resistor 3, and conductor 87 to the cathode 85 of the rectifier discharge device 67. In order to impress a direct-current voltage across resistor 109 which is proportional to the arc potential, the resistor 109 is connected across the output terminals of a rectifying circuit 115, the input terminals of which are connected by conductor 118 to the receptacle 126 and conductor 144 to the conductor 132. Similarly, the control resistor 111 is connected across the output terminals of a rectifying circuit 147, the input terminals of which are connected across the current transformer 150 on the conductor 132 whereby the direct current voltage impressed across resistor 111 is proportional to the current flowing through the electrode 122. As in the previous case, the rectifying circuits 115 and 147 are so connected across the resistors 109 and 111, respectively, that the direct-current voltages impressed thereacross are of opposite polarity for controlling the direct-current biasing potential of the grids 93 and 95 of the full wave rectifier discharge device 67.

In constructing the system, the resistors 1 and 3 are selected so as to assure a negative bias on the grids of the rectifier discharge devices 66 and 67 when the electrode 122 is in an ideal operating position and the direct-current voltages across the control resistors are so balanced that the differential of the direct-current voltage is substantially zero. The resistors 64 and 65 in the circuit with the sets of discharge devices 24—26 and 25—27, respectively, are so adjusted by adjusting the flexible leads 70 and 71, respectively, that the drop across the portion of the resistors 64 and 65 in circuit with the grids of the sets of discharge devices 24—26 and 25—27 gives a sufficient dead zone to prevent simultaneous firing of both sets of the discharge devices.

In operation, assuming that the system is energized, the electrodes 122, 128 and 130 may be positioned with respect to the metal 124 in the receptacle 126 by any suitable means such as by manual operation or automatically. Assuming that the initial positioning of the electrodes is to be obtained automatically, as soon as the system is energized and power is to be supplied to the arc furnace 120, a potential exists from the electrode 122 to the metal 124 in the receptacle. This potential is at a maximum and since the electrodes 128, 130 are not as yet adjusted, there is no current flow. The high value of the arc potential impresses a high value of direct-current voltage across each of control resistors 108 and 109, and since current is not flowing through the electrode 122, the direct-current voltage across resistors 110 and 111 proportional to the flow of current in the electrode is zero. The direct current voltage across resistor 109 places a large negative bias on the grids 93 and 95 of rectifier device 67 whereas the direct-current voltage across resistor 108 places a less negative or more positive bias on the grids 92 and 94 of the rectifier discharge device 66.

The bias thus impressed on the grids 92 and 94 is such that the rectifier discharge device 66 is rendered conductive with the result that current flows from the center tap of the secondary winding 80 through conductor 90, resistor 64, conductors 68, 44, 88, self-biasing resistor 1, conductor 86, cathode 84 and anodes 72 and 74 through conductors 76 and 78, respectively, to the terminals of the secondary winding 80 of the transformer 82. Since the direct current voltage proportional to the arc potential is at a maximum, the conductivity of the rectifier discharge device 66 is also a maximum and maximum current flows through the resistor 64. The flow of the current through the resistor 64 renders the direct-current biasing potential on the grids 48 and 50 of the discharge devices 24 and 26 more negative so that the grid-cathode potential of those devices is so lowered below the critical potential of the devices and the devices are blocked with the result that no current flows therethrough to the motor 10.

At the same time, the large direct current voltage proportional to the arc potential impressed across resistor 109 cooperates with the self-biasing resistor 3 to impress a more negative biasing potential on the grids and prevent the rectifier 67 from conducting. By preventing the firing of the rectifier 67 there is no current flow through the resistor 65 in the anode-cathode circuit of the rectifier 67 and with the direct-current biasing potential thus reduced the resultant grid-cathode potential of the devices 25 and 27 rises above the critical potential of the devices and the devices 25 and 27 become highly conductive to pass current to the motor 10. This conducting circuit may be traced from the center tap of the secondary winding 33 of transformer 35, through conductors 47, 88, and 44, armature windings 12 of the motor 10, conductor 46, conductor 45, to and through the parallel conductors 41 and 43 to the cathodes 37 and 39, respectively, of the devices 25 and 27 and the anodes 29 and 31, respectively, to the terminals of the secondary winding 33, to so energize the motor 10 as to effect the operation thereof to lower the electrode 122. Since the other electrodes 128 and 130 are as yet not in contact with the metal bath 124, the electrode 122 is lowered to a position where it engages the metal in the receptacle 126.

In lowering the electrode 122, it is apparent that the potential between the electrode 122 and the metal 124 decreases with the result that the direct-current voltage across resistors 108 and 109 is so decreased that the bias on the grids of the rectifier devices 66 and 67 is respectively rendered more negative and less negative. By rendering the biasing potential of the grids of the rectifier device 66 more negative, the current flow through the resistor 64 for controlling the direct-current biasing potential of the devices 24 and 26 more nearly approaches the value where the discharge devices 24 and 26 can be rendered conductive.

As soon as the other electrodes 128 and 130 are actuated in a similar manner to a point where a circuit is completed through the electrodes 122, 128, and 130 in conjunction with the metal bath 124, maximum current flows through the electrode with the result that a direct-current voltage proportional to the current is imposed across control resistors 110 and 111 with the result that the differential of the direct-current voltages across control resistors 110—108 and 111—109 is such as to place a more negative bias on the grids of the rectifier discharge device 66 and a less negative bias on the grids of the rectifier device 67.

The less negative or more positive bias on the grids 93 and 95 of rectifier device 67 renders the rectifier conducting so that current flows through the circuit which may be traced from the center tap of the secondary winding 81 of transformer 83, through conductor 91, resistor 65, conductor 69, conductor 45, self biasing resistor 3, conductor 87, cathode 85, and the anodes 73 and 75 of rectifier discharge device 67, through conductors 77 and 79, respectively, to the terminals of the secondary winding 81. The current flowing through that part of the resistor 65 in the grid cathode circuit of the discharge devices 25 and 27 is such as to render the direct-current biasing potential on the grids 49 and 51 of the devices 25 and 27, respectively, more negative to effectively block the firing of said devices and prevent the flow of current therethrough to the motor 10.

On the other hand, the change in the biasing potential of the grids 92 and 94 of the rectifier discharge device 66 is such as to effectively block the passing of current by the rectifier device 66 with the result that the current flow through the resistor 64 is so decreased or becomes zero so that the direct-current biasing potential on the grids 48 and 50 of the discharge devices 24 and 26, respectively, becomes less negative or more positive and the devices 24 and 26 become conducting to pass current to the motor 10. This conducting circuit may be traced from the center tap of the secondary winding 32 of transformer 34 through conductor 46, armature winding 12 of the motor 10 and conductor 44 to the parallel conductors 40 and 42 and the cathodes 36 and 38, respectively, anodes 28 and 30, respectively, of the devices 24 and 26, respectively, to the terminals of the secondary winding 32 to so energize the motor 10 as to effect an operation thereof in a direction to raise the electrode 122.

The electrode 122 is thus raised to a position for ideal operation of the arc furnace in which position the direct current voltage across resistors 110 and 111 which is proportional to the current flow through the electrode 122 and the direct current voltage across resistors 108 and 109 which is proportional to the arc potential are balanced so there is a zero differential of direct current voltage across the series-connected control resistors 108 and 110 and the series-connected control resistors 109 and 111. With the differential voltages zero as described, the self-biasing resistors 1 and 3 function to maintain sufficient bias on the grids of the rectifier devices 66 and 67 whereby they are sufficiently conducting to pass sufficient current through resistors 64 and 65 that the direct current biasing potential on the grids of discharge devices 24, 26, 25 and 27 is sufficient to block the devices from passing current to the motor 10. It is also noted that by correctly setting the position of the variable leads 70 and 71 with regard to the resistors 64 and 65, respectively, a dead zone is provided for preventing the simultaneous operation of the two sets of discharge devices 24—26 and 25—27.

If the ideal operating condition for the arc furnace is changed in any manner whatsoever, the balance of the direct-current voltage across the control resistors is upset with the result that the bias on the grids of the rectifier discharge devices 66 and 67 is changed to effect the operation of the motor 10 in a predetermined direction depending upon the change in the ideal operating conditions. If, for example, the electrode 122 should come in contact with the metal 124, as by reason of a cave-in of the metal, the arc potential is reduced to a minimum and the current flowing through the electrode is increased to a maximum, with the result that the differential of the direct-current voltages across the resistors 108 and 110 is such as to place a more negative bias on the rectifier discharge device 66 and the differential of the direct current voltages across resistors 109 and 111 is of such polarity as to render the grids of the rectifier device 67 more positive and thereby render the discharge device 67 conductive. Again, as in the earlier illustration, when the discharge device 67 is rendered conductive, the flow of current through the resistor 65 so changes the grid-cathode potential of the devices 25 and 27 as to effectively block them, whereas the decrease in the direct current flowing through the resistor 64 so changes the direct-current biasing potential as to render the grids of the devices 24 and 26 less negative whereby they are rendered conducting to operate the motor 10 to raise the electrode 122.

As will be appreciated, any unbalance in the direct-current voltages across the control resistors in response to a change in the ideal operating conditions for the electrode 22 effects an immediate change in the current flowing through the armature 12 of the motor 10, so that in the case of the system illustrated in Fig. 2 direct control of the direction of operation of the motor 10 is obtained, and, as the motor is operated to move the electrode 122 to its ideal operating position, the speed of the motor is so changed as to decrease the speed of the movement of the electrode and prevent an overrun in the positioning of the electrode.

The system of this invention is very sensitive, giving quick response in the control of the motor and, by utilizing the full wave rectifier discharge device in the manner described, a simplification of the circuits is obtained. The full wave rectifier device utilized performs the functions of rectifying, amplifying, and controlling the system. As illustrated, the system is adapted to wide use, since it is capable of maintaining a constant speed as in the embodiment of Fig. 1, or of controlling the direction of rotation and the speed of a reversible motor as in the embodiment of Fig. 2.

Although this invention has been described with reference to particular embodiments thereof, it is, of course, not to be limited thereto except insofar as is necessitated by the scope of the appended claims.

I claim as my invention:

1. In a speed control system, in combination, a motor the speed of which is to be controlled, a pair of electric valves disposed to connect the motor to a source of alternating current and to control the speed of the motor, the electric valves having grids to be utilized for controlling the conductivity thereof, a control circuit disposed for controlling the bias imposed on the grids, the control circuit including a resistor connected in circuit with the grids for controlling the bias thereof, means including a full-wave rectifier discharge valve having control grids therein for supplying a variable direct current to the resistor, and means comprising a source of control voltage variable in response to changes in the speed of the motor disposed to control the bias on the control grids of the rectifier discharge valve and thereby control the conductivity of the pair of electric valves.

2. In a control system for regulating the feeding of an electrode for producing and maintaining an electric arc, the combination comprising, a motor the speed of which is to be controlled, a pair of electric valves disposed to connect the motor to a source of alternating current and to control the speed of the motor, the electric valves having grids to be utilized for controlling the conductivity thereof, a grid control circuit including a resistor for the electric valves, a full-wave rectifier discharge valve having control grids therein to be utilized for controlling the flow of direct current through the resistor to control the bias of the grids of the electric valves, and a pair of sources of control voltages variable in opposite senses for controlling the bias imposed on the control grids of the rectifier discharge valve and thereby control the conductivity of the electric valves and the speed of the motor.

3. In a control system for regulating the feeding of an electrode for producing and maintaining an electric arc, the combination comprising, a motor the speed of which is to be controlled, a pair of electric valves disposed to connect the motor to a source of alternating current and to control the speed of the motor in the one direction, the electric valves having grids to be utilized for controlling the conductivity thereof, a control circuit disposed for controlling the bias imposed on the grids, the control circuit including a resistor connected in circuit with the grids, a full-wave rectifier discharge valve having control grids therein to be utilized for controlling the flow of direct current through the resistor, and means including a pair of sources of control voltages variable in opposite senses for controlling the bias of the control grids and thereby control the speed of the motor.

4. In a control system for regulating the feeding of an electrode for producing and maintaining an electric arc, the combination comprising, a reversible motor the direction and speed of which is to be controlled, a plurality of pairs of electric valves disposed to selectively connect the motor to a source of alternating current and control the direction and speed of the motor, each of the electric valves having a grid to be utilized for controlling the conductivity thereof, a grid control circuit including a resistor for each pair of the electric valves, each of the resistors having a full-wave rectifier discharge valve connected in circuit relation therewith for controlling the flow of direct current therethrough to control the bias of the grids of the pair of electric valves, each of the rectifier discharge valves having a pair of control grids, and a plurality of pairs of sources of control voltages, each pair of sources being connected in circuit relation with the control grids of an associated rectifier discharge valve, the pairs of sources being of opposite polarity when the pairs are unbalanced to render only one of the rectifier discharge valves conducting at a time to thereby selectively control the conductivity of the pairs of electric valves and the operation of the motor.

JACK E. REILLY.